UNITED STATES PATENT OFFICE.

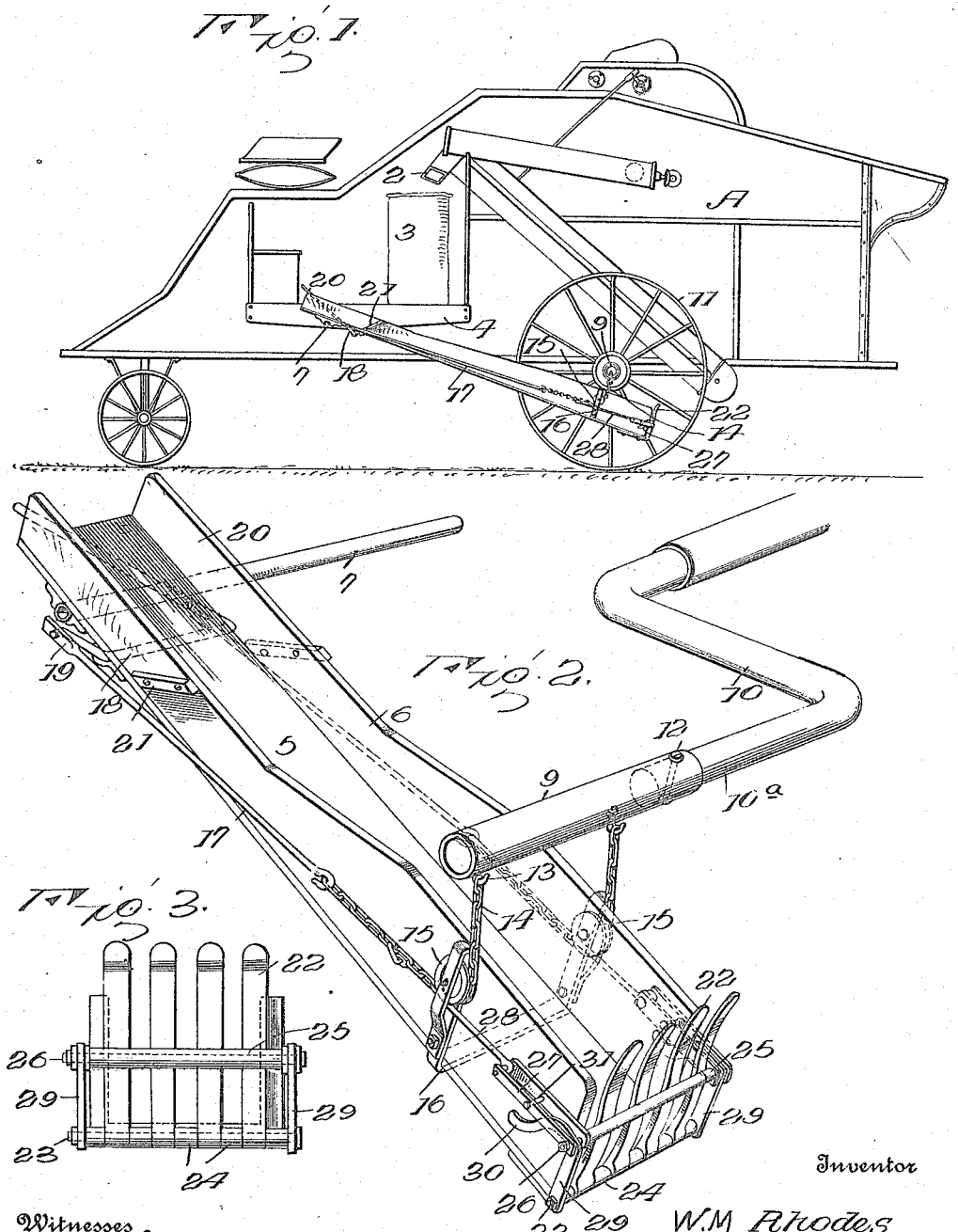

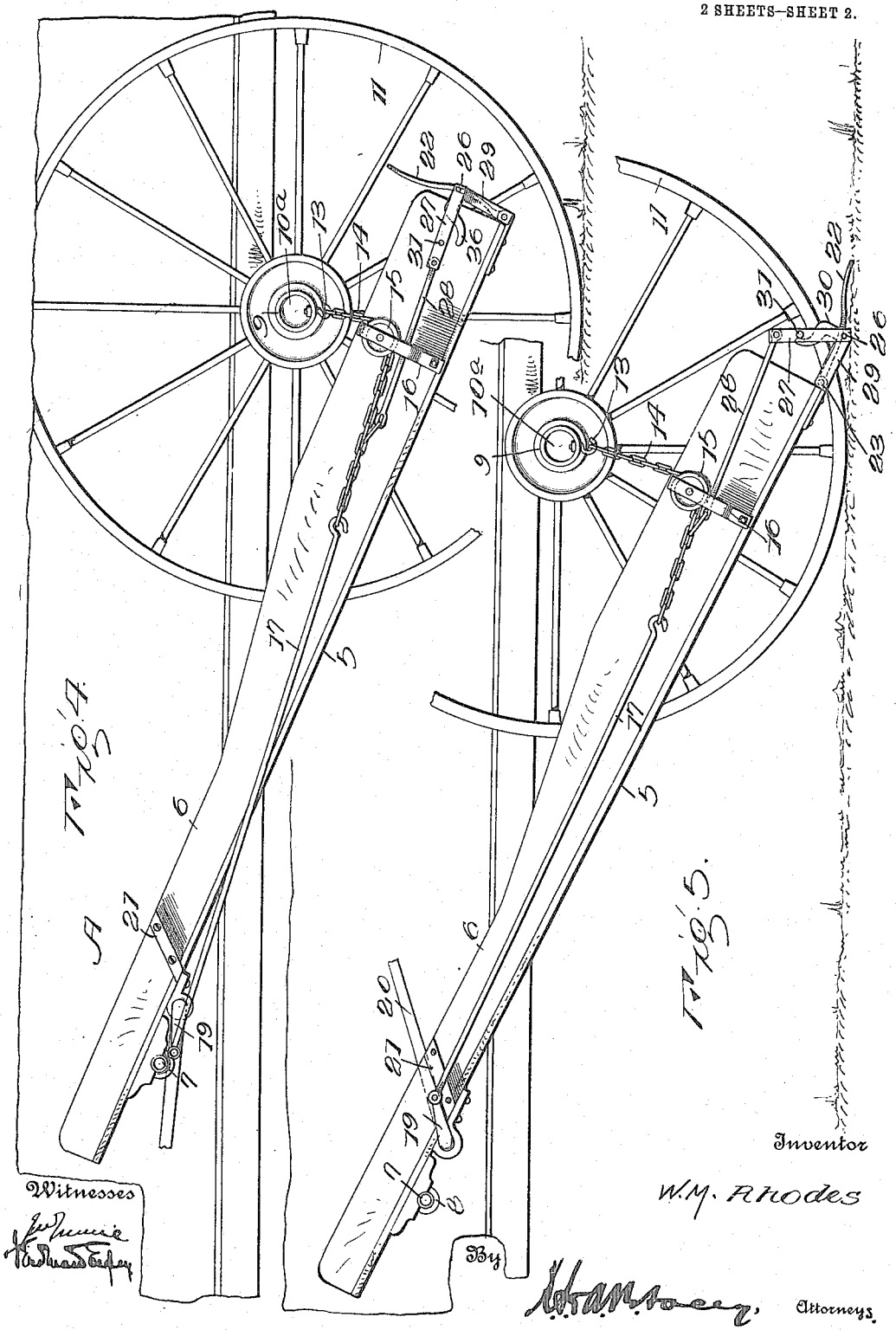

WILLIS M. RHODES, OF MOSCOW, IDAHO.

GRAIN-BAG CHUTE FOR HARVESTERS.

1,135,620.  Specification of Letters Patent.  Patented Apr. 13, 1915.

Application filed November 15, 1913. Serial No. 801,249.

*To all whom it may concern:*

Be it known that I, WILLIS M. RHODES, citizen of the United States, residing at Moscow, in the county of Latah and State of Idaho, have invented certain new and useful Improvements in Grain-Bag Chutes for Harvesters, of which the following is a specification.

My invention relates to what are known as combined harvesters, that is, harvesting machines wherein threshing mechanism is combined with the reaping mechanism, and particularly to the mechanism for operating the bag chute to allow the bags filled with grain to drop upon the ground. In this type of harvesters, the threshed grain is delivered from a spout into bags and these bags are sewed up by an operator and then deposited in the chute which leads from the bag-sewing platform to the ground.

The object of my invention is the provision of a bag-sewing platform adapted to be normally supported at its lower end at a predetermined distance from the ground but having its free end so supported that it may drop downward adjacent to the ground to deliver the bags.

A further object of my invention is the provision of pivoted fingers closing the lower end of the chute, which fingers are automatically turned down when the operator causes the lower end of the chute to drop to engage the ground and form a slideway over which the bags may gently pass onto the ground.

A further object of the invention is to provide a quickly detachable chute easily applied to and as easily removed from harvesting mechanism of this type so that when the chute is removed the harvester may pass through narrow gates and barn doors.

A still further object of the invention is the provision of improved means for raising and lowering the rear end of the chute and operating the fingers forming the gate.

Other objects will appear in the course of the following description.

My invention is illustrated in the accompanying drawings, wherein:—

Figure 1 is a side elevation of the combined harvester with my chute attached thereto. Fig. 2 is a perspective view of the chute detached. Fig. 3 is an end elevation of the gate at the lower end of the chute. Fig. 4 is a fragmentary side elevation of the harvester showing the chute in its raised position, and Fig. 5 is a like view to Fig. 4, but showing the chute with its lower end dropped.

Corresponding and like parts are referred to in the following description and indicated in all the views of the accompanying drawings by the same reference characters.

Referring to the drawings, A designates a harvester of the type referred to. The threshed grain is discharged from the thresher of the combined harvester out through a spout 2 and is discharged into bags 3 resting upon a platform 4. Upon this platform the operator who is to sew the bags sits.

My improved chute which is illustrated in Fig. 2, comprises a bottom board 5 and the oppositely disposed vertically extending side boards 6. The upper end of the chute is supported by means of a transversely extending supporting rod 7 which is preferably in the form of a short section of pipe to which the chute is rigidly attached. This is insertible in an opening 8 formed in the frame of the machine. This supporting rod 7 acts as a pivotal support for the upper end of the chute. The lower end of the chute is supported by means of a short section of pipe 9 adapted to be telescoped over an axle stub 10ª upon which one of the traction wheels 11 is mounted. This axle 10ª is a crank axle and is illustrated clearly in my co-pending application, Serial No. 802,247, filed on the 15th day of Nov., 1913. The tubular member 9 is held engaged with the stub of the crank axle by means of a set-screw 12, or in any other suitable manner. It is to be understood that the traction wheel 11 rotates upon the axle stub 10ª and the crank axle is only shifted for the purpose of raising or lowering the traction wheel.

Passing through the tubular member 9 are hooked bolts 13 to which are attached the parallel chains 14. These chains pass over pulleys 15 mounted upon a yoke 16 which embraces the lower end of the chute. To the rear end of each chain is attached a connecting rod 17 which passes upward and is connected to the crank arms 19 of a shaft 18 which extends beneath the upper end of the chute forward of the supporting rod 7. One of the crank arms is extended radially outward to form a handle 20 whereby the shaft 18 may be rotated. The shaft 18 is mounted in any suitable bars on the under side of the chute.

Inclined stops 21 are mounted upon the sides of the chute and act to limit the extent of rotation of the cranks on the shaft 18. When the shaft 18 is rotated to raise the forward end of the chute the cranks pass the center line or pull and thus the shaft 18 with its cranks is locked and the chute held raised.

The lower end of the chute is provided with a gate formed of a plurality of vertically disposed fingers, these fingers being preferably of relatively thin resilient metal and each of the fingers being designated 22. These fingers are mounted at their lower ends upon a transverse bolt 23 passing through ears formed upon the side board 6, the fingers being spaced from each other by spacing sleeves 24, or in any other suitable manner. Extending transversely across the middle of the fingers is a tubular member 25 through which passes a bolt 26. Pivotally connected to this bolt are the pairs of links 27, one pair on each side of the chute. The rear ends of each pair of links is connected by a short rod 28 to the chain 14, rearward of the point where the chain passes beneath the pulleys 15, as shown clearly in Fig. 4. In order to prevent these links getting upon a dead center when the fingers are turned to open position, I provide the angular members 29 each of which is pivoted at its lower end upon the bolt 23 and is pivoted at the junction of the two arms upon the bolt 26. The upper arm 30 of this angular member is curved upward and then downward and rearward so as to engage beneath a stop pin 31 passing between the two connecting rods 27. Under normal circumstances when the fingers are in the position shown in Fig. 4 the extremities of the legs 30 of the angular members 29 are out of contact with the stop pins 31, but when these angular members are turned to the position shown in Fig. 5, so that the fingers 22 lie upon the ground, the extremities of the legs 30 will contact with the stop pins 31 and thus the links 27 will turn to the position shown in Fig. 5, so that these links 27 and the members 29 will together constitute bell cranks, and the connecting rods 28 instead of drawing in a line passing through the pivotal center of the fingers will draw from a point above the pivotal center of the fingers and thus permit the lateral upward movement of the fingers when the lever 20 is operated.

The operation of my invention will be obvious from the above description. Normally when the chute is raised in the position shown in Fig. 4, the bags are deposited by the operator sitting on the platform 4 into the chute one at a time, until the chute is sufficiently filled to be dumped. The operator then shifts the lever 20 from the position shown in Figs. 2 and 4 to the forward position, thus rocking the crank shaft 18. The forward movement of the connecting rod 17 slackens the chain 14 and the lower end of the chute will drop downward. At the same time this slackening of the chains 14 will permit the gate to rotate forward and downward to the position shown in Fig. 5, whereupon the bags contained within the chute will slide down the chute and be deposited upon the ground. The fingers 22 being resilient and being independent of each other will more or less conform to the contour of the ground and thus the bags will slide gently down upon the ground without any dropping. This dropping of the bags upon the ground is to be avoided. Inasmuch as the fingers are spaced from each other the stubble over which the fingers pass will project up through the fingers and will engage the bags and assist in drawing the bags from the chute.

It is to be noted that the lower end of the chute is always supported a predetermined distance from the ground. If the machine is moving on level ground the crank axle 10 will be in a neutral position. If the machine is moving over a side hill the crank axle will either be depressed or raised, according to the inclination of the ground, by the mechanism illustrated in my co-pending application, before referred to, but inasmuch as this raising or lowering of the crank axle corresponds to the inclination of the ground over which the machine is traveling, the lower end of the chute will always be supported at a certain distance from the ground. This would not be the case were the chute suspended from any other portion of the machine except the crank axle. It is particularly necessary that the lower end of the chute be supported at a certain distance from the ground in order that when the lower end of the chute is lowered it shall move a distance sufficient to bring the fingers into contact with the ground, as otherwise, the bags will drop, which as above stated, is to be particularly avoided.

It is to be noted that the angular members 29 are so formed that while they prevent the connecting rods attached to the gate from passing onto a dead center, yet they disengage from the stop pins 31 when the gate is closed and do not impede the free movement of the gate.

My invention is simple and I have found it entirely effective in practice.

Having thus described the invention what is claimed as new is:—

1. The combination with a wheeled body, of a chute pivotally supported at one end, a pivoted gate closing the lower end of the chute, and means for lowering or raising the free end of the chute and simultaneously opening or closing the gate.

2. The combination with a cranked axle, of a chute pivotally supported at one end and at its other end flexibly connected to said cranked axle, and manually operable means for raising or lowering the lower end of the chute, with relation to the cranked axle.

3. In a harvester, the combination with a supporting frame and an axle, of a chute having at one end a transversely extending rod insertible through an opening into said frame, a tubular supporting member slidable upon said axle, means for suspending the lower end of the chute from said tubular supporting member, and independent means for raising or lowering the chute.

4. The combination with a chute pivotally supported at its upper end, of a pivoted gate adapted to close the lower end of the chute, a supporting member disposed above the lower end of the chute, flexible connections attached to said supporting member engaging the chute adjacent its lower end and then extending longitudinally of the chute, branch connections leading from said flexible connections to the gate, and means at the upper end of the chute for slackening said flexible connections to lower the chute and open the gate, or tightening said connections to raise the chute and close the gate.

5. In a harvester, the combination with a chute pivotally supported at its upper end, a gate pivoted to the lower end of the chute, a supporting member extending across the lower end of the chute above the same, pulleys mounted on the sides of the chute, crank arms mounted on the upper end of the chute, connections from said crank arms to the supporting member passing beneath said pulleys, and manual means for operating said crank arms.

6. In a harvester, the combination with a chute pivotally supported at its upper end, a gate pivoted to the lower end of the chute, a supporting member extended across the lower end of the chute above the same, pulleys mounted on the sides of the chute, crank arms mounted on the upper end of the chute, connections from said crank arms to the supporting member passing beneath said pulleys, manual means for operating said crank arms, and branch connections leading from said first-named connections to the gate and engaging the middle thereof.

7. In a chute of the character described, a gate closing the lower end of the chute and comprising a plurality of spaced fingers pivotally supported upon the bottom of the chute, a cross-bar connecting said fingers to each other, rearwardly extending links pivotally connected to the ends of the cross bar, operative connections engaging said links, angular members pivoted to the axis of the gate and connected to said cross-bar, the ends of said angular members extending rearward and then downward beneath the links, and stops mounted on the links with which the extremities of the angular members engage when the gate is in its lowered position.

8. In a harvester, a chute pivoted at its upper end for movement in a vertical plane, a supporting member disposed above and across the chute adjacent its lower end, pulleys mounted on the sides of the chute below the supporting member, a crank shaft mounted near the upper end of the chute and having oppositely disposed cranks, connecting rods extended from said cranks, chains passing from the lower ends of the connecting rods through said pulleys to said supporting member, a gate pivoted to the lower end of the chute at the bottom thereof, and operative connections between said chain and the middle of said gate at each end thereof.

9. The combination with a vehicle body, a cranked axle and a traction wheel thereon, of a chute, a supporting member forming a pivotal support for the upper end of the chute and extending into the opening in the said body, a supporting member for the lower end of the chute disposed above the same and engageable with the end of the cranked axle, pulleys mounted on the chute below said supporting member, a manually operable crank shaft mounted on the upper end of the chute and having spaced cranks, connecting rods leading from each crank, stops disposed beneath the connecting rods, a flexible connection passing from the lower end of each connecting rod under the corresponding pulleys and upward to the second-named supporting member, a gate pivoted at its lower end to the bottom of the chute at the lower end thereof, a transverse bar extending across the middle of the gate, and link connections extended from said bar to each of said flexible connections.

In testimony whereof I affix my signature in presence of two witnesses.

WILLIS M. RHODES. [L. S.]

Witnesses:
 J. D. YOAKLEY,
 FREDERIC B. WRIGHT.

Copies of this patent may be obtained for five cents each, by addressing the "Commissioner of Patents, Washington, D. C."